May 4, 1948. W. C. PFEIL 2,440,872
ICE CUBING MACHINE
Filed Sept. 4, 1945 8 Sheets-Sheet 1

Fig. 1.

Inventor:
William Carl Pfeil

May 4, 1948.  W. C. PFEIL  2,440,872
ICE CUBING MACHINE
Filed Sept. 4, 1945  8 Sheets-Sheet 2

Fig. 2.

Inventor
William Carl Pfeil
By Thiess, Olson & Mecklenburger
Attys.

Patented May 4, 1948

2,440,872

UNITED STATES PATENT OFFICE 2,440,872

ICE-CUBING MACHINE

William Carl Pfeil, Chicago, Ill.

Application September 4, 1945, Serial No. 614,283

21 Claims. (Cl. 62—112)

My invention relates to a new and novel method of and machine for continuously cubing ice. More particularly my invention relates to a continuous operation for producing uniform ice cubes.

Various machines have been heretofore proposed to cut large blocks of ice into smaller pieces. Whether the smaller pieces were cubes or of other shape, probably the most accepted and widely used machine is the one having its cutting elements in the form of tubes through which steam or hot water flows. Machines employing banks of rotating saws have also been used but mostly where substantial production is necessary and large amounts of ice have to be cut to supply the demand. The latter type of machine has been highly objectionable, however, although capable of producing substantial amounts of cut ice. Ice is a peculiar substance to handle and will often fracture and split where least expected. Consequently, many accidents have happened in operating the type of machine employing rotating saws. Attendants have many times suffered the loss of their hands because the ice cake would split suddenly or because an effort would be made to cut as much of the cake as possible without coming too close to the saws. On the other hand, saws produced an excessive amount of powdered ice in their operation which accumulates and must be disposed of during the time of operation. This causes a delay in production and an expense in disposing of the fine ice.

The present invention proposes to gain the advantage of both types of machines without incurring the disadvantages of the type employing rotating saws.

Accordingly, the invention is directed to a new and improved structure of ice cutting machine employing heated cutting elements and means to produce a substantial quantity of cut ice in minimum time.

To accomplish this object, the invention is designed to adopt a continuous or substantially continuous cutting operation by a plurality of grids having heated cutting elements, the grids being constructed and related to the operation so that the slabbing of ice cakes can be carried on continuously while previously slabbed cakes can be subjected to the remaining steps necessary to effect the formation of the cubes. Various novel features are incorporated in the machine to effect substantially automatic operation and cause a predetermined sequence to be followed so that one of the cubing grids will be available for use after each slabbing operation is completed.

A still further object of the invention is to provide a machine of the type described which will effect a substantial saving in labor and eliminate the hazards of operations heretofore experienced in handling machines of larger capacity.

It will be understood that the machine disclosed herein is practically automatic in its operation and requires very little labor to operate the same.

The operations will be accurately performed and ice cubes will be produced which will be clean and uniformly cut.

In order to apprise those skilled in the art how to practice the invention disclosed herein, I shall now describe a preferred embodiment, which may vary according to the particular needs of the machine to be used.

Any suitable frame may be employed to support the parts to be hereinafter described.

Figure 15:
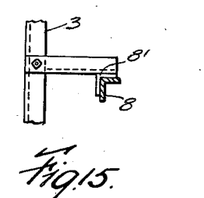
Fig. 15 is a sectional detail view taken on line 15—15 of Fig. 6 and illustrates the slot in which the legs of a vertical table move.

Referring to Figs. 1 to 4, inclusive, a slightly inclined feeding platform 1 is mounted along one of the sides of a horizontal grid 2. The grid has a sub-frame 69 mounted at the top of a main frame 3. Ice cake 4 slides sidewise on spaced slots 54' from the slightly inclined platform 1 between raised side ribs 54 over horizontal grid 2 which consists of a series of parallel heated cutting elements 5. The weight of the ice cake forces the cake through the heated cutting elements 5 and cuts the cake into a stack of ice slabs 6. A vertically moving table 7 carried by frame 8, which may be slidably movable say in frame members 8' attached to main frame 3, as shown in detail in Fig. 15, is positioned so as to have its top surface 7' support the ice cake when the latter has been slid over horizontal grid 2. A plurality of slots 9 in the table top are located so as to enable the table top to slide through horizontal cutting tubes 5 of horizontal grid 2 and thereby rest against and support the downwardly moving longitudinal ice cake. Horizontal grid 2 is mounted on the main frame 3 in a position which is slightly below the frame top. This enables the table top to move up flush against the bottom of the ice cake and allows the cutting tubes to be protected while the ice is sliding from inclined platform 1 to grid 2. The cutting elements nest in the slots below the table top.

Figure 2:
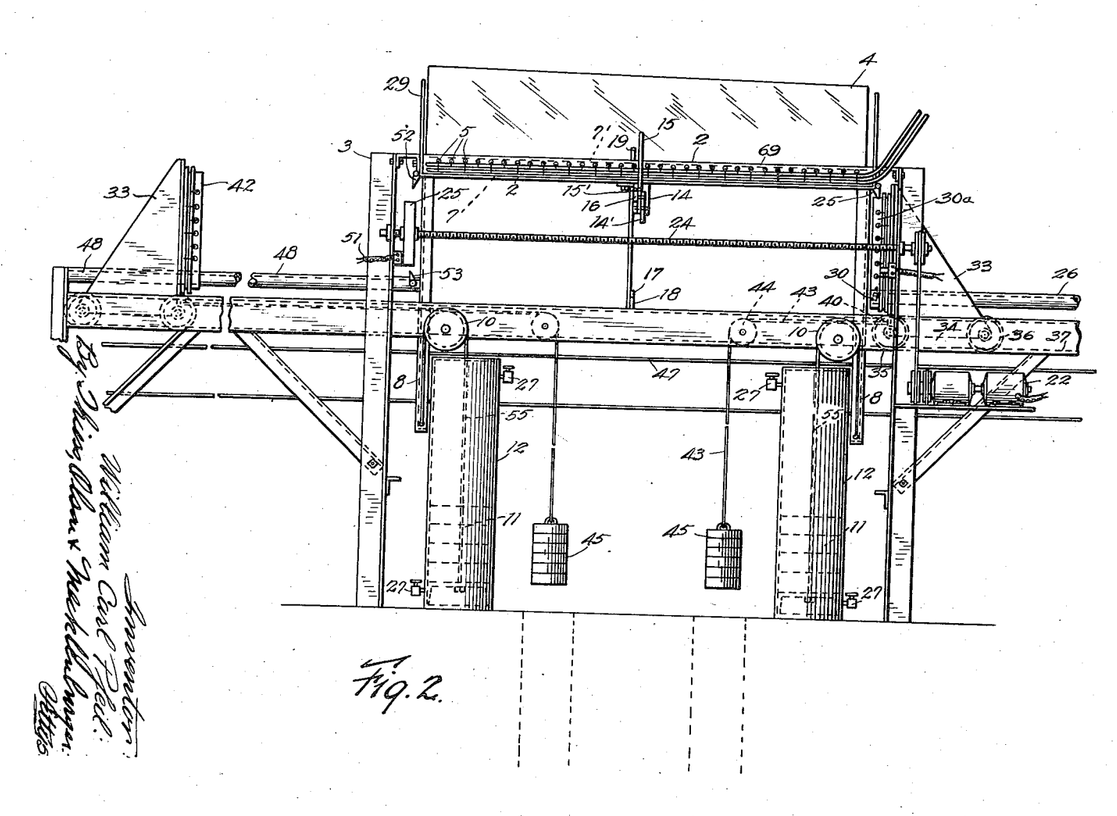
Fig. 2 is a front elevational view showing an ice cake resting over a horizontal ice-cutting grid just before the ice cake starts its downward movement on a platform through a plurality of horizontal ice cutting elements of the grid.
Figure 3:
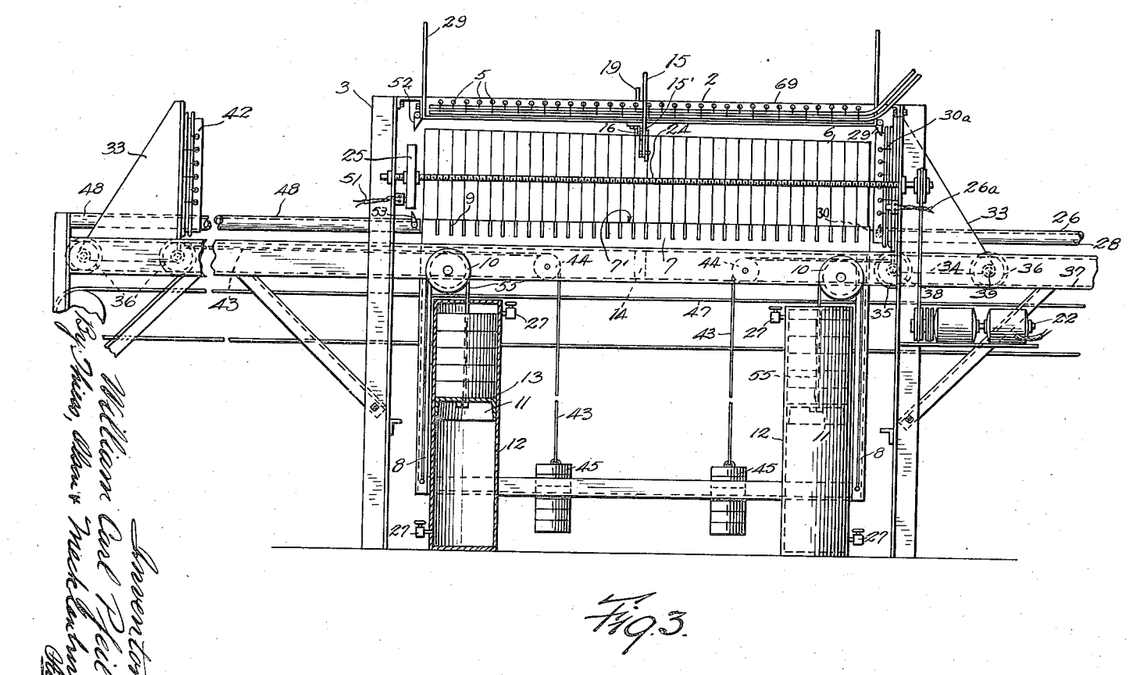
Fig. 3 is the same front elevation showing the ice cake after it has passed through the horizontal cutting elements and has been cut into ice slabs.

As previously stated, frame 8 is slidably received in frame members 8' as shown in detail in Fig. 15. However, as shown in Fig. 3, for example, frame 8 is connected near the bottom corners to pulley cables 55, which slide on pulley wheels 10, and which have their other ends connected to weights 11 which may be, if so desired, but optionally, enclosed in the cylindrical housing 12. Weights 11 are fitted with leather or composition cups 13, as shown in Fig. 3, to make airtight pistons in the cylinders 12. The combined counterbalancing action of all the pulley weights is sufficient to cause the table 7 to move vertically upwards until its top 7' is flush with the ice cake feeding platform 1 when the table is empty. At this point the slots 9 will have nested therein the cutting elements 5, and the latter will prevent the table from moving any higher. The amount of counterweighting is made sufficient to cause the table to readily move upwards with sufficient additional counterweight present so that the descending cake of ice will only have part of its weight exerted upon the horizontal cutting elements. Thus for a 350 pound ice cake, the amount of counterweight would be made sufficient to lift the table and to counterweigh about 300 pounds of the ice cake. This would mean that only about 50 pounds of the weight of the ice cake will be exerted on the horizontal cutting elements and will be the force that causes table 7 to descend. The length of the pulley cables 55 and the position of the cylindrical housings 12 are such that when the pulley weights are at their bottom position, the table top 7' will be flush with the ice cake feeding platform, this being shown in Fig. 2.

Figure 6:
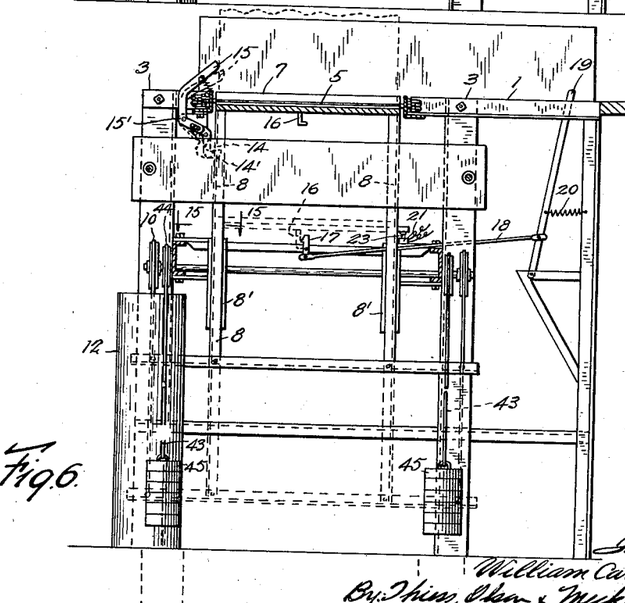
Fig. 6 is a sectional detail view taken on line 6—6 of Fig. 1.

A locking pin 14, shown in Fig. 6, may be mounted on one of the members of frame 8 at any suitable point from grid 2. As the ice cake moves from the inclined feeding platform 1 to grid 2, the cake will be slightly tilted and will not rest evenly over grid 2 on table 7 until all of the cake has left feeding platform 1. In order to prevent the slabbing operation beginning while the cake of ice is still in a slanting position and before completely on table 7, a locking pin 14 is provided. When the ice cake moves completely on table 7, it contacts and throws a trip release arm 15, which is suitably pivoted on a part of the frame of the machine at say 15', the arm 15 being so shaped as to tilt a pivotally mounted lever 14' clockwise to withdraw it from pin 14 to permit table 7 to begin its downward movement. It will be understood, however, that the parts 14 and 15 may be omitted and the counterbalancing action relied upon to start the downward movement by the weight of the ice only after the entire cake has been positioned upon table 7. In other words, the counterbalancing may be related to require the entire weight of the cake to be carried by table 7 so that the weight of the cake will only be sufficient to effect downward movement when it is entirely positioned on the table.

A hook 16 fastened to the bottom of the table, as shown in Fig. 6, connects with a latch 17 which is mounted on a cross bar of frame 3 so as to connect with the hook 16 when the bottom of the table has reached its lowest position. This locks the table and prevents it from resuming its upward movement until the next cake of ice has moved down the inclined platform 1.

Figure 1:
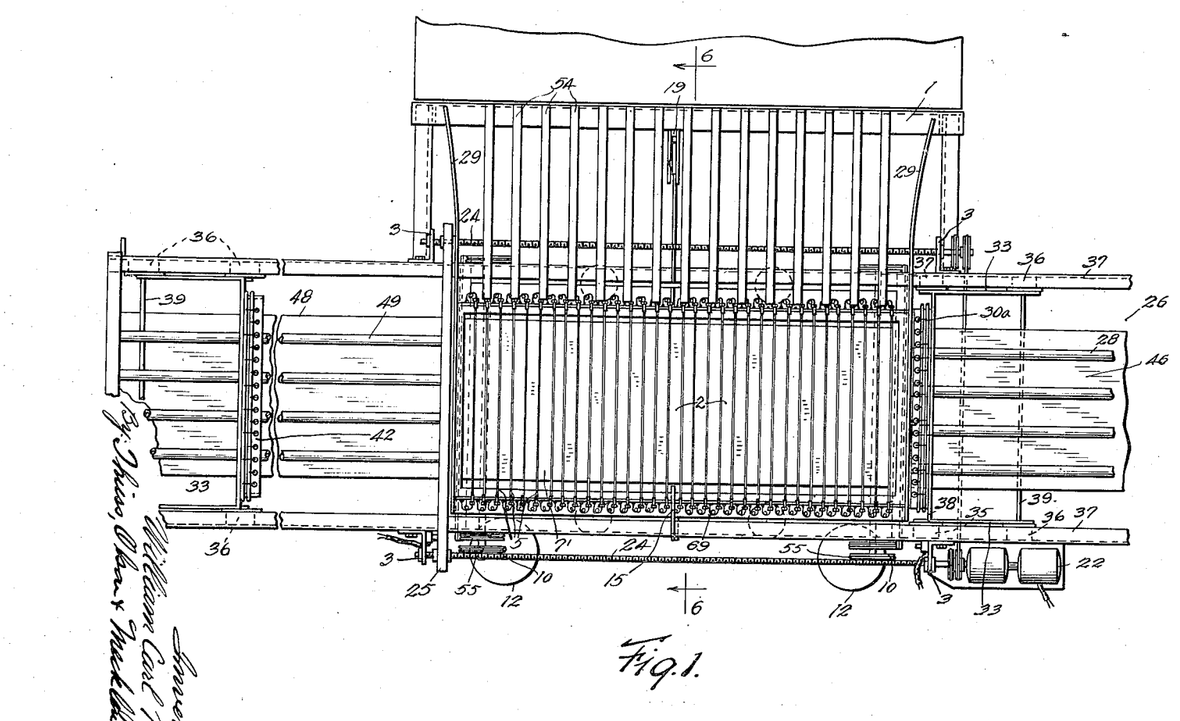
Fig. 1 is a top plan view of the machine embodying the invention.
Figure 4:
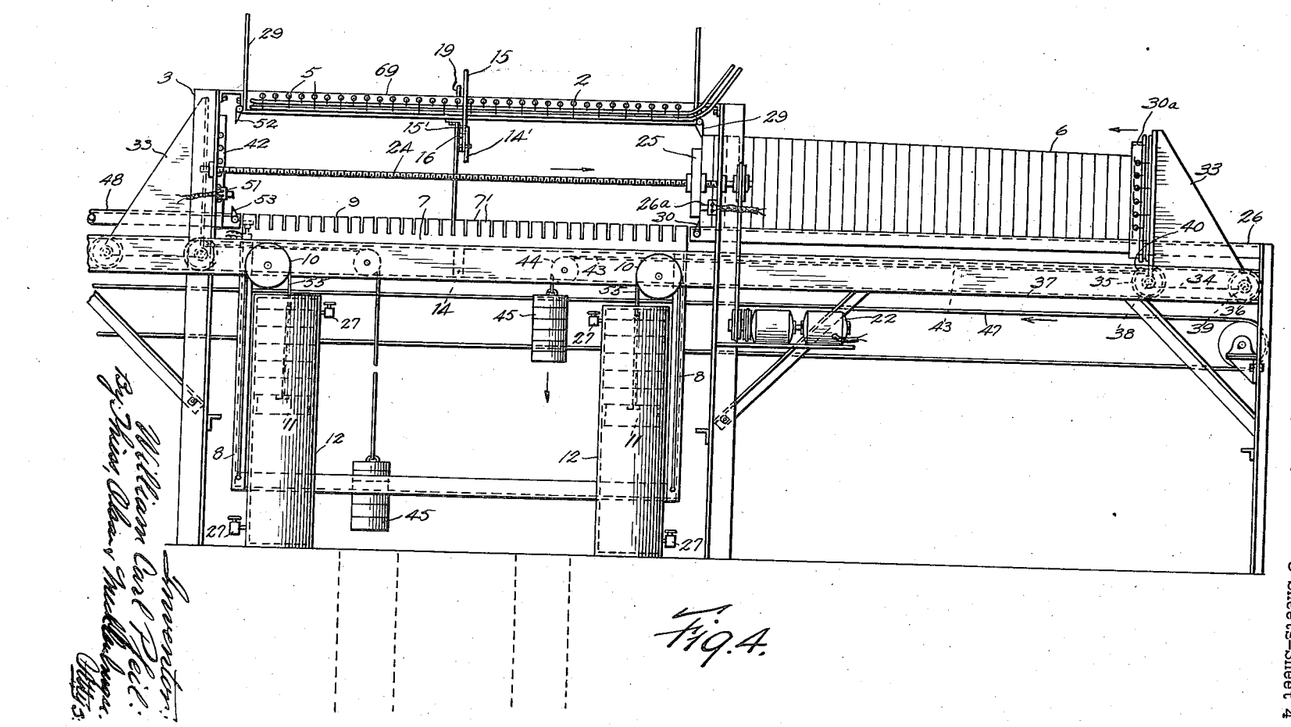
Fig. 4 is a front elevational view showing the stack of ice slabs after they have been moved to a side end receiving platform.
Figure 13:
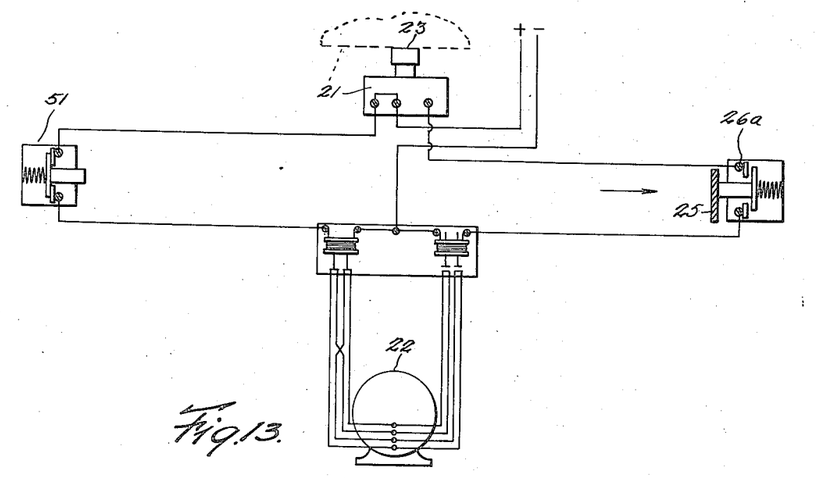
Fig. 13 is a wiring diagram showing the connections of a three-way electrical switch when a reversing motor is causing a pusher bar to move the stack of ice slabs shown in Fig. 4 to the right.
Figure 14:
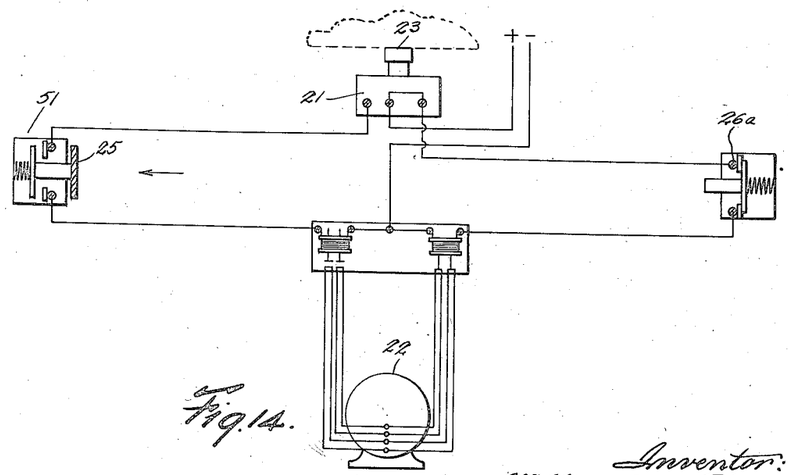
Fig. 14 is the same wiring diagram showing the connections of the electrical switch when the motor has been reversed and is causing the stack of ice slabs to move to the left.

As the second cake of ice moves down the inclined platform, it contacts and moves a latch releasing device consisting of a trip rod 18 connected at one end to the latch and at the other end to the trip arm 19 which protrudes into the inclined platform. After the sliding ice cake has released the latch by contacting this trip arm, the spring 20 causes trip arm 19 to return to its original position. When the table has reached the bottom of its motion and is locked by the latch 17, it actuates a switch button 23 which causes an electric switch 21 to operate on electric motor 22. The details of this switch 21 are shown in Figs. 13 and 14. The reversing motor 22 is designed to drive a pair of feed screws 24 disposed on opposite sides of the machine, as shown in Figs. 1 to 3, inclusive. Feed screws 24 function to move a transverse pusher bar 25 back and forth in a lengthwise direction of the machine. When motor 22 rotates in one direction, pusher bar 25 is driven to move the ice slabs shown in Fig. 3 onto a right end platform 26, as shown in Fig. 4. When the pusher bar 25 reaches the end of its travel on feed screw 24, it operates a switch 26a to stop motor 22, thereby discontinuing the lateral motion of the pusher bar.

Ice cakes to be cubed moving on the inclined feeding platform 1 may be spaced, if so desired, so as to have each succeeding ice cake hit the tripper arm 19 in a predetermined timed relation to release the vertical moving table 7 from the latch lock 17 to enable the table to move up back to its top flush position with the inclined feeding platform 1. As table 7 released from its latch moves upwards, it ascends rapidly until near the top of its travel, when it comes to a gradual stop by choking-off the escaping air in the cylindrical housing 12 through small air valves 27 near the top of the housings 12, there being similar valves 27 near the bottom for controlling the escape of air during the descent of table 7.

End receiving platform 26 includes a series of parallel pipes 28 which are mounted at one end to the side of the frame 3. The space between the pipes 28 is open and is large enough to allow ice cubes to fall through, but not large enough to allow the fall of ice slabs being pushed onto this platform from the top of the moving table by the pusher bar. After the pusher bar 25 has pushed the stack of ice slabs 6 onto the platform 26, the dogs 29 and 30 prevent the ice slabs from moving back to table 7. As the slabs of ice are moved onto this side end receiving platform 26 by pusher bar 25, they engage a vertical grid 30a equipped with a series of parallel horizontal and vertical heated cutting elements 31 and 32 and move the grid 30a outwardly.

Figure 5:
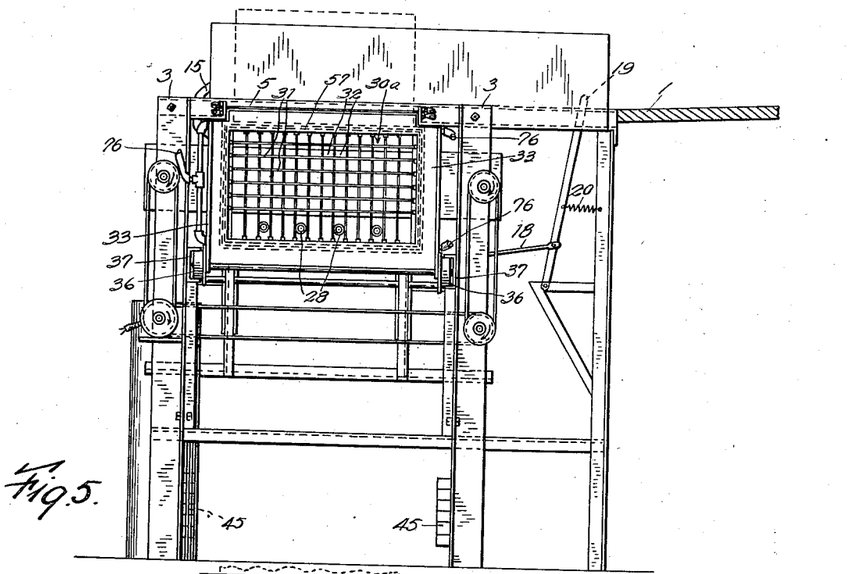
Fig. 5 is an end view of the machine.

This vertical grid is a moving unit which is mounted on a triangular frame 33, a flexible steam or hot water connecting hose 76 shown in Fig. 5 being provided to supply either steam or hot water to these cutting elements to effect the cutting action by this vertical grid. The lower portion 34 of frame 33 is connected at each side to front and rear wheels 35 and 36. These wheels are mounted in spaced longitudinal rails 37 to ride freely therein and be carried by axles 38 and 39. Cables 43 are attached at 40 to opposite sides of frame 33. The opposite ends of these cables 43 pass over pulley wheels 44 and are attached to weights 45. Weights 45 place a constant forward pull on vertical grid 30a in a direction opposite to the movement of the ice slabs by the pusher bar 25. When pusher bar 25 is pushing the ice slabs 6 to the right, as shown in Fig. 4, the effect of the weights 45 causes grid 30a to be constantly urged against the slabs of ice 6. The force of pusher bar 25 is, however, greater than that of the opposing force created by weights 45 tending to urge vertical grid 30a against the slabs, and hence grid 30a is moved outwardly, during which time its cutting elements may be cutting the outermost slab or slabs into cubes. Because of this fact, vertical grid 30a is constantly being urged against the ice slabs, not only during the time they are placed upon side table 26, but after they are on table 26. This continuing pressure causes the horizontal and vertical heated cutting elements 31 and 32 to cut through the ice slabs 6 and form the same into ice cubes.

As previously stated, end platform 26, over which the vertical grid 30a is directly mounted, consists of a series of spaced pipes 28 having open spaces 46 between them. As the vertical grid 30a is urged against the ice slabs 6, the resulting ice cubes drop through the spaces 46 onto a continuously moving belt 47 which continuously removes the deposited ice cubes to any suitable ice cube receiving means. Dogs 29 and 30 prevent any of the ice slabs from sliding back to the space over the vertically moving table 7. These dogs are particularly desirable when the switch 30 has been actuated by pusher bar 25 at the end of the latter's movement, as is shown in Fig. 4. Actuation of switch 26a stops the reversing motor 22, thereby stopping the pusher bar. The vertical grid 30a, however, is not connected to any power means but has its lateral motion caused by the effect of weights 45. When the pusher bar stops its movement, the entire stack of ice slabs has been transferred from the vertically moving table to the end platform 26. During this time the vertical grid 30a has been leaning against the forward end of this ice stack, and a portion of the ice slabs 6 has been cut into ice cubes and has dropped through the spaces 46 onto the belt 47 and has been removed. The remaining portion of ice slabs is then cubed by the constant motion of the vertical grid 30a against the same which is being caused by the effect of weights 45. Grid 30a will continue to move inwards toward the end of the vertically moving table 7 until all of the ice slabs have been cubed. During this period the dogs 29 and 30 are preventing the ice slabs from being pushed back off the end platform 26 onto the table 7.

With the ribs 54 of feeding platform 1 guiding the ice cake within the frame of the machine and with the vertically moving table pushing up against the ice, the ice cannot shift while being slabbed, so that it is cut perfectly straight. The same is true with the ice slabs resting on the end platform and the cubing grid 30 being pulled back through the ice slabs. The result is perfect ice cubes.

While the remaining portion of ice slabs is being cubed by grid 30a moving towards the end of the vertically moving table 7, the latter has had its bottom released from the latch lock 17 by means of the action of the next oncoming ice cake striking against tripper arm 19 on the ice feeding platform 1 and has moved upwards back to a position flush with this receiving platform, as shown in Fig. 2. At this point, the slots 9 in the table top 7' have enabled the table top to slide past the horizontal cutting tubes 5 and the latter are positioned about one-inch more or less below the table top, as shown in Fig. 6. When the top of the vertically moving table 7 is at this flush position, the next ice cake is ready to slide from the slightly inclined ice feeding platform 1 onto the horizontal grid 2. This second ice cake then starts a cycle or sequence of action similar to that just described for the first ice cake. While the ice slabs 6 of the first ice cake are being cubed by the moving grid 30a on the end receiving platform 26, the second cake on table 7 is moving through the horizontal grid 2, thereby causing this table 7 to move down to form the next stack of ice slabs. The spacing of the ice cakes on the slightly inclined ice feeding platform is so arranged that table 7 receives the next ice cake in the form of ice slabs and arrives at its bottom position at or previous to the time when the vertical grid 30a has completed its ice cubing action on the previous stack of ice slabs. When the table 7 reaches its bottom point the second time, it strikes switch button 23 which causes electric switch 21 to re-start reversing motor 22 in an opposite direction to that which it had hitherto operated, causing the feed screw 24 to rotate in an opposite direction and thereby causing pusher bar 25 to begin its motion to the other end of feed screw 24 and of the vertical table 7.

Fig. 14 shows the contact positions of switch 21 and its circuit connections when the motor 22 is caused to reverse its direction. When table 7 reaches the bottom, a second stack of ice slabs 6 is resting on it, as shown in Fig. 3. At this point, hook 16 at the bottom of the table connects with the locking latch 17 and holds the table at its bottom position while, as just described, the reversing motor 22 has caused the pusher bar 25 to start its motion towards the opposite direction, namely, in the case of Fig. 4, towards the left. As the pusher bar 25 pushes these ice slabs 6 shown in Fig. 3 to the left this time, it moves the stack of slabs onto a left end receiving platform 48, which is identical with the right end platform 26 and consists of a series of spaced parallel pipes 49 having between them open spaces 50. When pusher bar 25 reaches the end of its leftward motion, and thereby has caused the complete removal of the stack of ice slabs from the top of table 7 onto the left end receiving platform 48, pusher bar 25 contacts another switch 51 to stop motor 22 and thereby to stop the pusher bar. During the time when pusher bar 25 has been moving the second stack of ice slabs 6 onto the left end receiving platform 48, a moving grid 42 substantially identical to grid 30a shown in Fig. 4 operates in the same manner on the left end receiving platform 48 to cause the cubing of this second stack of ice slabs 6. The continuous ice cube receiving belt 47 extends across the right end receiving platform right on through the main frame and onto the left end receiving platform. Falling ice cubes from both the right and left end platforms can thereby be received by this continuous belt and carried to any desired designation. The dogs 52 and 53 operate in a manner identical with that of the dogs 29 and 30 at the right end of the vertically moving table and prevent the ice slabs on the left end receiving platform 48 from moving back to any point of the plane on the vertically moving table. While this second stack of ice slabs is being cubed by grid 42 mounted over the left end receiving platform 48, a third ice cake will be moving down the inclined feeding platform 1 to contact trip arm 19, thereby causing table 7 to resume its upward motion ready to receive the third ice cake. When the table 7 moves down to its bottom position the third time, switch 21 will revert to the original position and establish the circuit connections indicated in Fig. 13. The rotation of motor 22 will be again reversed and cause pusher bar 25 to again move in a horizontal direction to the right, thereby sending the next batch of ice slabs to the end platform 26 at the right of the table 7.

From the standpoint of production efficiency, it is preferable to have ice cakes on the ice feeding platform 1 so spaced that there is a minimum loss of ice cubing action. To accomplish this, the spacing should be such that an ice cake operates the tripper bar 19 a short time after pusher bar 25 has finished moving a stack of ice onto either the left or the right end receiving platforms 26 and 48. By the proper timing of the moving ice cakes on the inclined platform, one may obtain a continuous automatic ice-cubing process wherein a very large volume of ice cubes can be produced in a short period of time.

While I prefer to arrange the feeding of ice cakes in a manner which will cause the table 7 to resume its upward motion from its bottom position as soon as pusher bar 25 has completed the removal of a stack of ice slabs, either right or left, this type of arrangement is not absolutely necessary. The dogs 29 and 30 at the right end and the dogs 51 and 52 at the left end of the table enable the slabs of ice on either the right end platform 26 or the left end platform 48 to be cut into cubes by the forward motion of the respective grids 30a and 42 without interfering in any way with any subsequent action of the moving table 7. One may therefore, if he so desires, increase the time during which the table is locked at its bottom position by means of the latch 17.

Figures 9, 10, 11, 12, 16, 17:
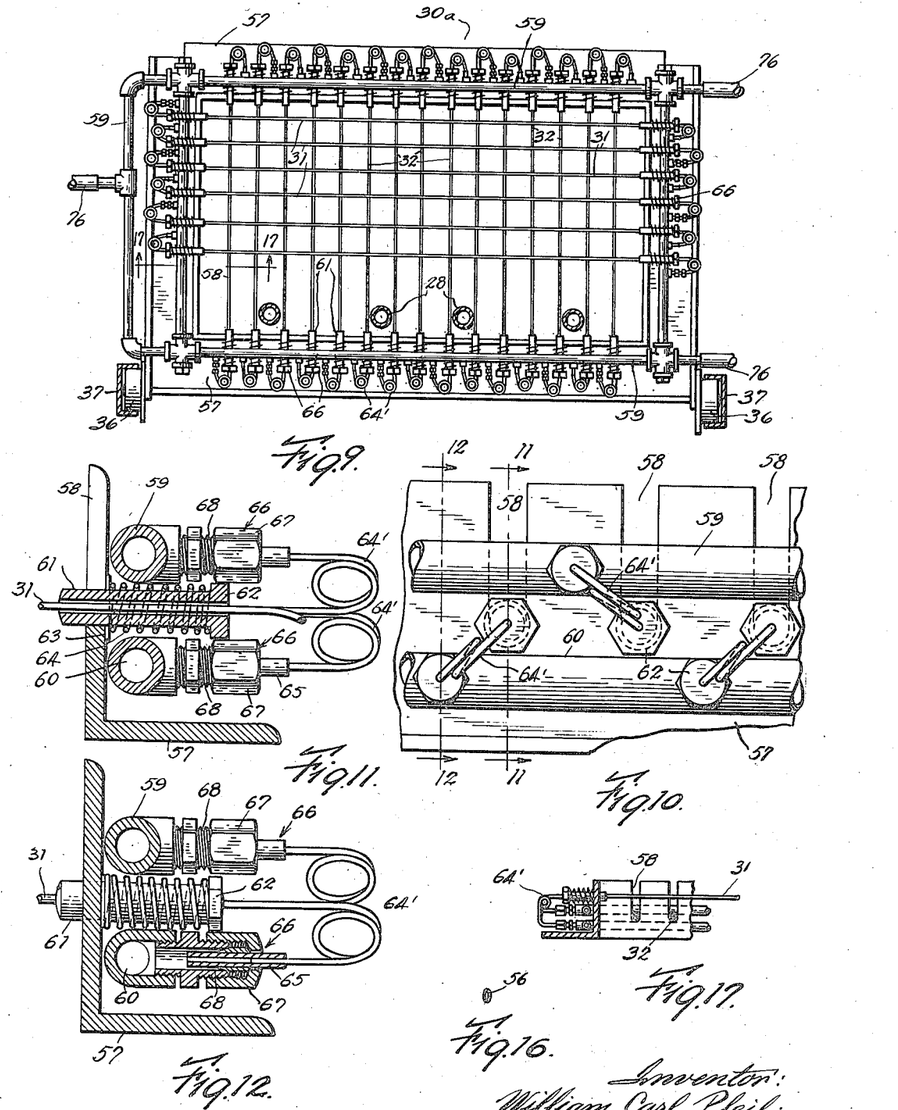
Fig. 9 is an enlarged face view of the vertical grid, viewing the cutting elements for cubing the ice and the movable platform upon which this vertical grid is mounted.
Fig. 10 is a detailed view of a portion of the frame and resilient mountings for the cutting elements.
Fig. 11 is a cross section taken on line 11—11 of Fig. 10 and illustrating the resilient mounting provided at the ends of each cutting element.
Fig. 12 is a cross section taken on line 12—12 of Fig. 10 and illustrates the resilient connection provided between the resilient mounting and the inlet and outlet headers circumscribing the grid frame.
Fig. 16 is a cross-sectional view of the cutting elements.
Fig. 17 is a sectional detailed view taken on line 17—17 of Fig. 9 and showing the slot arrangement for the horizontal and vertical heated tubes of the vertical grid.

Figs. 7 to 12 and 16 and 17 show the details of the parts forming the cutting grids 2, 30a and 42. Grids 30a and 42 are formed by rectangular frames 57, each being provided with a series of open spaced slots 58, as shown in Fig. 10, in the vertical leg thereof on all four sides. The slots 58 are cut along the top of the frame 57 so as to admit of ready removal of either of the cutting elements 31 or 32 without disturbing the mounting of the frame itself or any of the other structural parts. Inlet and outlet connections heretofore designated generally as 76 and disposed between the source of heat supply and the cutting elements 31 and 32 are inlet pipes 59 supplying steam or hot water to the cutting elements 31 and 32 and outlet steam pipes 60 acting as a return means. The mounting carries the ends of these tubes for heated elements 31 and 32 in the open slots 58, and the connections between these mountings and the inlet and outlet pipes 59 and 60 are shown in detail in Figs. 10, 11, and 12.

Since the heated cutting elements 31 and 32 are in the form of thin walled tubes of small diameter through which a heating medium such as steam or hot water is passed, the thin walls allow rapid heat transfer and a more efficient rapid cutting action. The small diameter of the heated cutting tubes effects a very definite and sharp cut with a minimum loss of material. Each cutting tube is fixedly secured within a bushing 61 lying in a slot 58 and having an enlarged head 62 at the outer end to form a shoulder at this end which cooperates with a washer 63 at the slot to confine a spring 64 therebetween. The tube continues beyond the bushing 61 and is coiled at 64', the end of the tube being fixedly secured within a sleeve 65 that forms a part of the detachable connection 66 in the form of a nut 67 threaded upon one end of a nipple 68. The nipple 68 has the other end threaded into either inlet pipe 59 or outlet pipe 60, as the case may be. Connection 66 may be the same for the end of a tube whether the end connects with inlet 59 or with outlet 60.

The resilient mounting formed by the bushings 61 and springs 64 enables the tilting or flexing of each tube without any permanent distortion. Each tube can readily return to its original position.

Figure 7:
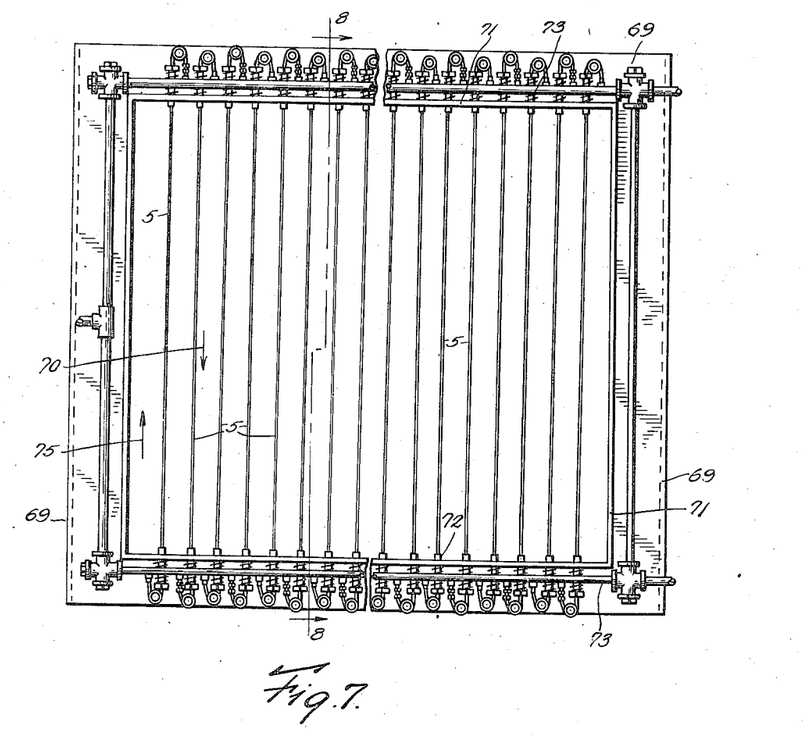
Fig. 7 is an enlarged detail top plan view of the horizontal grid and its cutting elements.
Figure 8:
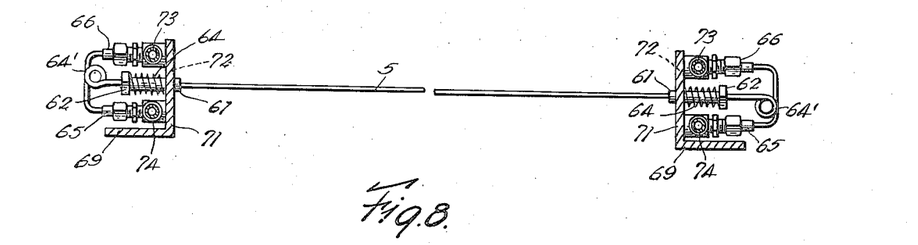
Fig. 8 is a sectional view taken on line 8—8 of Fig. 7 showing one of the cutting elements and its mounting.

The horizontal grid 2 is shown in detail in Fig. 7. The cutting elements 5 are mounted substantially in the same manner as the cutting elements 31 and 32 of grids 30a and 42. The frame member 69 has its inside legs 71 slotted as indicated at 72 to receive the tube mountings. The slots 72 are similar to the slots 58 in frame 57. Inlet and outlet pipes 73 and 74 are similar to inlet and outlet pipes 59 and 60. The mountings likewise comprise bushings 61 having heads 62 thereon between which and the legs 71, springs 64 are disposed so as to permit cutting elements 5 to flex against the action of springs 64 and thereby permit their return to normal position without causing a permanent distortion. The ends of the cutting elements 5 extend through the bushings 61 and are coiled at 64', the extremities thereof being similarly secured in a sleeve 65, as illustrated in Fig. 12, which is detachably connected by a connection 66 to either the inlet or outlet pipes 73 and 74, as the case may be.

The novel type of mountings exemplified by the springs 64 and the bushings 61 removably resting in open slots together with the coiled ends 64', may be advantageously used in connection with electrically heated cutting elements. Consequently, in so far as these features are concerned, the disclosure is not to be limited to a fluid heating element.

Any of the cutting tubes 5, 31 and 32 may be readily replaced if desired by detachably connecting the ends thereof at 66 and lifting the bushings 61 out of slots 58 or 72. If these cutting elements are to be heated by steam or other suitable fluid such as hot water, they may be tubes of exceptionally small diameter which is desirable in order to reduce waste due to melting when the ice is being cut. Fig. 16 at 56 shows the preferred form of the cutting tubes in cross section, namely, an elliptical shape. I have found that the type of resilient mounting herein disclosed permits the use of tubes of minimum diameter consistent with adequate circulation of the heating fluid and efficient heat distribution.

The above described structure for the heated cutting tubes also makes possible uniform heat distribution with respect to the cutting area covered by the cutting elements. By aligning the inlet and outlet connections in parallel arrangement about the frames of each grid, the ends of the cutting elements may be laterally connected along one side to the inlet and outlet connections. Thus, pipes 73 and 74 on each side of frame 69, and pipes 59 and 60 about the frame 57, may be connected in such a manner, for example, as illustrated in Figs. 7 and 10. As shown in Fig. 10, for example, the first cutting element 5 at the left may have its top end connected to the outlet pipe 74, while its bottom end will be connected to the inlet pipe 73 so that the flow of the heating medium will be in the direction shown by the arrow 75. The next cutting element at the right will then have its top end connected to the inlet pipe 73, and its bottom end connected to the outlet pipe 74 on the left-hand side of frame 69, so that the flow of the heating medium will be in the direction of the arrow 70. This method of connection of the ends of the cutting elements 5 with respect to the inlet and outlet connections 73 and 74 on opposite sides of frame 69 may be continued for all these cutting elements whereby the final result will be to have the heating medium flowing in opposite directions with respect to adjacent cutting elements. Consequently, if there is any tendency for the end of the cutting element attached to the inlet connection of being hotter than the end attached to the outlet connection, a uniform distribution of heat will be obtained over the entire area covered by all the cutting elements of one grid. One side of the block of ice will not be cut at an excessively great rate so as to result in uneven length. The same method of attaching the ends if the cutting elements 31 and 32 of grids 30a and 42 will be noted in Figs. 9 through 12, inclusive.

It will be apparent from the foregoing description that various novel features are involved which may be omitted or changed without departing from the invention as it pertains to other features embodied in the machine. For example, the substructure involving table 7 and grid 2 disposed in relatively movable relation to permit a relative upward movement of the cutting elements with the weight of the ice being slabbed resting upon the table to minimize the strain on these cutting elements and the amount of melting during the cutting due to an upward cutting action through the cake of ice is novel and may be used to slab the cake of ice without subsequently cubing the same by grids 30a and 42. The counterbalancing action of table 7 is also novel where it is desirable to have the table 7 move and not grid 2. It may be relied upon to move table 7 only when the cake of ice is entirely moved onto the table. However, if greater leeway is desirable, the latching device employing pin 14 and trip 15 may be used so as to assure positioning of the cake of ice squarely upon table 7 and uniform cutting if there should be a tendency to produce non-uniform cutting when the cake of ice is not properly positioned upon table 7. Moreover, locking pin 16 and trip lever 19 serves to prevent an upward return movement of table 7 before pusher bar 25 may have an opportunity to clear this table of all the slabbed ice. Table 7 is thereby held and will only return when the next cake of ice is timed to move forwardly from platform 1. During the time the next cake of ice is being slabbed, the pairs of dogs 29 and 30 and 52 and 53, or equivalent means, will hold the slabs of the first cake upon the receiving means or tables 26 and 48 and the circuit connections of the motor 22, including the switch 21, will be changed in their relation so as to cause pusher bar 25 to reverse its movement and push the slabs of this next cake to the opposite receiving table. Switches 26a and 51 are arranged in the circuit to immediately arrest the movement of pusher bar 25 so that it will remain out of the path of table 7 for the next slabbing operation. A further novel feature of the invention resides in the unique manner of mounting the grids 30a and 42 and putting them into operation so that cubing starts as soon as the first slab is moved sidewise together with all the slabs of a cake of ice thus cut. Time is thereby saved and an arrangement is made possible where the cutting by grids 30a and 42 can be timed to be accomplished in the same period it takes to raise table 7 and receive a cake of ice and grid 2 to cut the same in slabs although the distance through the ice which grids 30a and 42 travel is greater than the distance traveled by grid 2.

It will be understood that in so far as the disclosure of the instant case, the terms "cube" or "cubing" shall mean any cutting of the slabs to smaller pieces and not the making of smaller pieces that are exactly cubical in shape. Even cylindrical pieces might be cut by substituting the type of grid disclosed and claimed in United States Letters Patent No. 2,316,282 granted April 13, 1943, for grids 30a and 42 shown herein.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In an ice cutting machine, the combination of a platform, a vertically movable table for receiving a cake of ice from said platform when the top of said table has moved upwardly to a position substantially flush with said platform, and a horizontal grid comprising a plurality of heated cutting elements for cutting said cake of ice into slabs when said cake of ice is resting on said table and the latter is moving downwardly, said table having a plurality of slots in its top to receive said heating cutting elements when said table is at uppermost position and before the cake of ice is positioned thereon.

2. In an ice cutting machine, the combination of a platform, a grid comprising a plurality of heated cutting elements for cutting a cake of ice, a table adapted to receive a cake of ice from said platform, means for providing relative movement between said grid and said table, said table having a plurality of slots in its top to receive said cutting elements before the cake of ice is positioned upon said table, the relative movement between said grid and said table causing said cutting elements to pass through the cake of ice, and locking means preventing said relative movement between said grid and said table, said locking means having a portion engageable by the cake of ice when the cake of ice is positioned upon said table whereby to release said locking means and effect relative movement between said grid and said table.

3. In an ice cutting machine, the combination of a platform, a movable table for receiving a cake of ice from said platform, a grid comprising a plurality of heated cutting elements for cutting said cake of ice into slabs when said cake of ice is resting on said table, there being relative movement between said table and said grid, a second grid disposed in a plane transverse to the plane of the first grid and comprising a plurality of heated cutting elements for cutting the slabbed ice into a plurality of smaller pieces, power driven means for moving said slabbed ice toward said second grid, and a trip adapted to be actuated by the relative movement between said table and said first grid upon completion of said slabbing operation for energizing said power driven means.

4. In an ice cutting machine, the combination of a platform, a table for receiving a cake of ice from said platform, a grid comprising a plurality of heated cutting elements for cutting said cake of ice into slabs when said cake of ice is resting on said table, there being relative movement between said table and said grid, a second grid disposed in a plane transverse to the plane of the first grid and comprising a plurality of heated cutting elements for cutting the slabbed ice into a plurality of smaller pieces, a second table disposed substantially transversely to the first table, means for moving said second grid along said second table, power driven means for moving said slabbed ice toward said second grid, and actuating means operating upon completion of said slabbing operation for energizing said power driven means.

5. In an ice cutting machine, the combination of a platform, a vertically movable table for receiving a cake of ice from said platform when said table has moved to its upper position, a grid comprising a plurality of heated cutting elements adapted to cut said cake of ice into a plurality of smaller pieces when said cake of ice is resting on said table, and counter-balancing means for said table tending to check the descent of said table when said cake of ice is placed thereon from said platform.

6. In an ice cutting machine, the combination of a platform, a grid comprising a plurality of heated cutting elements for cutting a cake of ice, a table adapted to receive a cake of ice from said platform, means for providing relative movement between said grid and said table, motor driven means adapted to move the cut ice from said table after the cutting operation is completed by said cutting elements of said grid, a second table to receive said cut ice, a second grid comprising similar cutting elements for effecting a second cutting operation upon said cut ice, and means to provide relative movement between said second grid and said cut ice as it is moved from the first table by said motor driven means.

7. In an ice cutting machine, the combination of a platform, a vertically movable table for receiving a cake of ice from said platform when said table has moved to its upper position, a horizontally disposed grid comprising a plurality of heated cutting elements for cutting a cake of ice into slabs when said cake of ice is resting on said table and said table is moving downwardly, a second table extending transversely to the movement of said first table but at the lower position of said first table, a vertically positioned grid movably mounted upon said second table, said grid comprising a plurality of cutting elements for cutting the slabbed ice into a plurality of smaller pieces, and means actuated by said first table to move the slabbed ice therefrom to said second table whereby to feed the same to said vertically positioned grid.

8. In an ice cutting machine, the combination of a platform, a vertically movable table for receiving a cake of ice from said platform when said table has moved to its upper position, a horizontally disposed grid comprising a plurality of heated cutting elements for cutting a cake of ice into slabs when said cake of ice is resting on said table and said table is moving downwardly, means for locking said table against movement when in its lower position, means actuated when said table is in its lower position to move the slabbed ice from said table, receiving means for said slabbed ice, a vertically positioned grid associated with said receiving means, said vertically positioned grid comprising a plurality of heated cutting elements, and means for actuating said vertically positioned grid to cube said slabbed ice, said actuating means being set into operation by the movement of said slabbed ice to said receiving means.

9. In an ice cutting machine, the combination of a platform, a vertically movable table for receiving a cake of ice from said platform when said table has moved to its upper position, a horizontally disposed grid comprising a plurality of heated cutting elements for cutting a cake of ice into slabs when said cake of ice is resting on said table and said table is moving downwardly, means for locking said table against movement when in its lower position, means actuated when said table is in its lower position to move the slabbed ice from said table, receiving means for said slabbed ice, a vertically positioned grid associated with said receiving means, said vertically positioned grid comprising a plurality of heated cutting elements, means for actuating said vertically positioned grid to cube said slabbed ice, said actuating means being set into operation by the movement of said slabbed ice to said receiving means, and means for releasing said table from its locked lower position to permit it to move to its upper position to receive another cake of ice when the latter moves beyond a predetermined point along said platform.

10. In an ice cutting machine, the combination of a platform, a vertically movable table for receiving a cake of ice from said platform when said table has moved to its upper position, a grid comprising a plurality of heated cutting elements for cutting a cake of ice into smaller pieces when said cake of ice is resting on said table, means for locking said table against movement when in its lower position upon completion of the cutting operation, means actuated when said table is in its lower position to move the cut ice from said table, and means for releasing said table from its locked lower position to permit it to move to its upper position to receive another cake of ice when the latter moves beyond a predetermined point along said platform.

11. In an ice cutting machine, the combination of a platform, a vertically movable table for receiving a cake of ice from said platform when said table has moved to its upper position, a plurality of heated cutting elements for cutting said cake of ice into slabs when said cake of ice is resting on said table and said table is moving downwardly, receiving means on opposite sides of said table to receive said slabbed ice, a grid positioned on each of said receiving means, power operated means to move said slabbed ice to each of said receiving means, said grids each having a plurality of heated cutting elements to cube said slabbed ice as it is fed to said respective receiving means, and means actuated through the movement of said table when said table reaches substantially its bottom position to operate said power means in alternate directions whereby the respective cakes of ice as slabbed are alternately fed to said oppositely disposed receiving means to be cubed by said cutting elements of said grids.

12. In an ice cutting machine, the combination of a vertically movable table for receiving a cake of ice when said table has moved to its upper position, a plurality of heated cutting elements for cutting said cake of ice into slabs when said cake of ice is resting on said table and said table is moving downwardly, receiving means on opposite sides of said table to receive alternately said slabbed ice, a grid positioned on each of said receiving means, power actuated means to move said slabbed ice to each of said receiving means, said grids each having a plurality of heated cutting elements to cube said slabbed ice as it is fed to said receiving means, and means actuated through the movement of said table when said table reaches substantially its bottom position to operate said power means in alternate directions whereby the respective cakes of ice as slabbed are alternately fed to said oppositely disposed receiving means to be cubed by said cutting elements of said grids.

13. In an ice cutting machine, the combination of a table for receiving a cake of ice, a plurality of heated cutting elements adapted to have relative movement with said table for cutting said cake of ice into slabs when said cake of ice is resting on said table and during said relative movement between said table and said cutting elements, receiving means on opposite sides of said table to receive said slabbed ice, a grid for each of said receiving means, means to move said slabbed ice to each of said receiving means, said grids each having a plurality of heated cutting elements to cube said slabbed ice as it is fed to said receiving means, and means actuable substantially at the end of said relative movement of said table and said first heated cutting elements to effect in alternate directions operation of said means moving the slabbed ice whereby the respective cakes of ice as slabbed are alternately fed to said oppositely disposed receiving means to be cubed by said cutting elements of said grids.

14. In an ice cutting machine, the combination of a vertically movable table for receiving a cake of ice, a plurality of heated cutting elements for cutting said cake of ice into slabs when said cake of ice is resting on said table and said table is moving downwardly, receiving means on opposite sides of said table to receive alternately said slabbed ice, a grid for each receiving means, power actuated means to move said slabbed ice to each of said receiving means, said grids each having a plurality of heated cutting elements to cube said slabbed ice as it is fed to said receiving means, and means actuated through the movement of said table when said table reaches substantially its bottom position to operate said power means in alternate directions whereby the respective cakes of ice as slabbed are alternately fed to said oppositely disposed receiving means to be cubed by said cutting elements of said grids.

15. In an ice cutting machine, the combination of a vertically movable table for receiving a cake of ice, a plurality of heated cutting elements for cutting said cake of ice into slabs, receiving means on opposite sides of said table to receive alternately said slabbed ice, a grid for each said receiving means, power actuated means to move said slabbed ice to each of said receiving means, said grids each having a plurality of heated cutting elements to cube said slabbed ice as it is fed to said receiving means, means to move said grids against said slabbed ice on said receiving means, and means actuated through the movement of said table when said table reaches substantially its bottom position to operate said power means in alternate directions whereby the respective cakes of ice as slabbed are alternately fed to said oppositely disposed receiving means to be cubed by said cutting elements of said grids.

16. In an ice cutting machine, the combination of a vertically movable table for receiving a cake of ice, a plurality of heated cutting elements for cutting said cake of ice into slabs, receiving means on opposite sides of said table to receive alternately said slabbed ice, a grid for each said receiving means, means operable alternately in opposite directions to move a slabbed cake of ice first in one direction to one of said receiving means and then the next slabbed cake of ice in the other direction to the other receiving means, the operation of said means being in alternate sequence to feed subsequent cakes of ice that have been slabbed in opposite directions to said receiving means, said grids each comprising a plurality of heated cutting elements to cube the slabbed ice as it is fed alternately to both of said receiving means, and means to mount said grids in movable relation to said receiving means and to move each grid against the slabbed ice as it is being placed upon receiving means.

17. In an ice cutting machine, the combination of a vertically movable table for receiving a cake of ice, a plurality of heated cutting elements for cutting said cake of ice into slabs, receiving means on opposite sides of said table to receive alternately said slabbed ice, a grid for each said receiving means, means operable alternately in opposite directions to move a slabbed cake of ice first in one direction to one of said receiving means and then the next slabbed cake of ice in the other direction to the other receiving means, the operation of said means being in alternate sequence to feed subsequent cakes of ice that have been slabbed in opposite directions to said receiving means, said grids each comprising a plurality of heated cutting elements to cube the slabbed ice as it is fed alternately to both of said receiving means, means to mount said grids in movable relation to said receiving means, means tending to urge said grids against said slabbed ice as it is being placed upon said receiving means from said table, and means for holding the slabbed ice as it is being cubed from being pushed into the path of said moving table during its operation of slabbing the next cake of ice.

18. In an ice cutting machine, the combination of a vertically movable table for receiving a cake of ice, a plurality of cutting elements for cutting said cake of ice into slabs, receiving means in opposite sides of said table to receive alternately said slabbed ice from successive cakes of ice fed to said table and cut by said cutting elements, a grid for each receiving means, each grid comprising a plurality of cutting elements for cubing the slabbed ice as it is placed upon each receiving means in successive operations, a pusher device movable crosswise of said table to move each successive cake of ice as it is slabbed in alternate directions to one of said receiving means, means for actuating said pusher device, and means controlled by the position of said movable table adapted to operate said actuating means when said table moves to its lower position upon completion of the slabbing operation of a cake of ice on said table.

19. In an ice cutting machine, the combination of a vertically movable table for receiving a cake of ice, a plurality of cutting elements for cutting said cake of ice into slabs, receiving means in opposite sides of said table to receive alternately said slabbed ice from successive cakes of ice fed to said table and cut by said cutting elements, a grid for each receiving means, each grid comprising a plurality of cutting elements for cubing the slabbed ice as it is placed upon each receiving means in successive operations, a pusher device movable crosswise of said table to move each successive cake of ice as it is slabbed in alternate directions to one of said receiving means, an electric motor for driving said pusher device, and an electric switch in the circuit of said motor adapted to be actuated when said table is moved to its lower position upon the completion of a slabbing operation of a cake of ice, there being means to cause said switch to reverse the rotation of said motor upon each subsequent operation.

20. In an ice cutting machine, the combination of a platform, a grid comprising a plurality of heated cutting elements for cutting a cake of ice, a table movable relative to said grid adapted to receive a cake of ice from said platform, the relative movement between said grid and said table causing said cutting elements to pass through said cake of ice, a releasable latch for preventing said relative movement, and an arm engageable by the cake of ice when fully positioned upon said table from said platform to trip and release said latch.

21. In an ice cutting machine, the combination of a platform, a grid comprising a plurality of heated cutting elements for cutting a cake of ice, a table movable relative to said grid adapted to receive a cake of ice from said platform, the relative movement between said grid and said table causing said cutting elements to pass through said cake of ice, releasable locking means for locking said table and said grid against relative movement, and a member actuable to release said locking means.

WILLIAM CARL PFEIL.

REFERENCES CITED

The following references are of record in the file of this patent:

UNITED STATES PATENTS

| Number | Name | Date |
| --- | --- | --- |
| 2,226,413 | Schwimmer | Dec. 24, 1940 |
| 2,339,109 | Pownall | Jan. 11, 1944 |